US008698908B2

(12) United States Patent
Slavin

(10) Patent No.: US 8,698,908 B2
(45) Date of Patent: Apr. 15, 2014

(54) EFFICIENT METHOD FOR REDUCING NOISE AND BLUR IN A COMPOSITE STILL IMAGE FROM A ROLLING SHUTTER CAMERA

(75) Inventor: Keith R. Slavin, Beaverton, OR (US)

(73) Assignee: Nvidia Corporation, Santa Clara, CA (US)

( * ) Notice: Subject to any disclaimer, the term of this patent is extended or adjusted under 35 U.S.C. 154(b) by 697 days.

(21) Appl. No.: 12/069,669

(22) Filed: Feb. 11, 2008

(65) Prior Publication Data

US 2009/0201383 A1    Aug. 13, 2009

(51) Int. Cl.
*H04N 5/228*    (2006.01)

(52) U.S. Cl.
USPC ....................................... 348/222.1

(58) Field of Classification Search
USPC ......... 348/208.2, 208.4, 208.7, 208.11, 222.1
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,685,071 A | 8/1987 | Lee |
| 4,739,495 A | 4/1988 | Levine |
| 4,771,470 A | 9/1988 | Geiser et al. |
| 4,920,428 A | 4/1990 | Lin et al. |
| 4,987,496 A | 1/1991 | Greivenkamp, Jr. |
| 5,175,430 A | 12/1992 | Enke et al. |
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A * | 12/1995 | Hamada et al. .......... 375/240.25 |
| 5,513,016 A | 4/1996 | Inoue |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Donald D. Spencer, "Illustrated Computer Graphics Dictionary", 1993, Camelot Publishing Company, p. 272.
Duca et al., "A Relational Debugging Engine for Graphics Pipeline, International Conference on Computer Graphics and Interactive Techniques", ACM SIGGRAPH Jul. 2005, pp. 453-463.
gDEBugger, graphicRemedy, http://www.gremedy.com, Aug. 8, 2006, pp. 1-18.

(Continued)

*Primary Examiner* — Aung S Moe
*Assistant Examiner* — Amy Hsu

(57) ABSTRACT

A rolling shutter digital camera. Each photographic image of a given exposure duration is captured as a multi-frame burst of frames each having a shorter exposure duration to minimize motion blur and to reduce sensor noise by averaging. Each frame is quantized into swaths, captured sequentially by the rolling shutter. Swaths of the first frames are analyzed to select a set of best motion detection reference regions. Swaths of subsequent frames are analyzed versus only those regions, to reduce required computation, and are re-registered accordingly. Corresponding swaths of each frame are accumulated. The accumulator is normalized to the desired bit depth and written as the final image. Averaging of the multiple frames is improved by re-registering swaths rather than entire frames, because of the time delta caused by the rolling shutter. Computation is further reduced by selecting candidate points only along a key line of each swath of the first frame, and still further by pre-limiting the search by using a thumbnail version of the first frame to cull most candidate points. Thresholds are used to ensure adequate motion detection regions are used for each swath.

11 Claims, 10 Drawing Sheets

(56) References Cited

U.S. PATENT DOCUMENTS

| | | | |
|---|---|---|---|
| 5,608,824 A | 3/1997 | Shimizu et al. | |
| 5,652,621 A | 7/1997 | Adams, Jr. et al. | |
| 5,793,433 A | 8/1998 | Kim et al. | |
| 5,878,174 A | 3/1999 | Stewart et al. | |
| 5,903,273 A | 5/1999 | Mochizuki et al. | |
| 5,905,530 A * | 5/1999 | Yokota et al. | 348/240.99 |
| 5,995,109 A | 11/1999 | Goel et al. | |
| 6,016,474 A | 1/2000 | Kim et al. | |
| 6,078,331 A | 6/2000 | Pulli et al. | |
| 6,111,988 A * | 8/2000 | Horowitz et al. | 382/249 |
| 6,118,547 A | 9/2000 | Tanioka | |
| 6,128,000 A | 10/2000 | Jouppi et al. | |
| 6,141,740 A | 10/2000 | Mahalingaiah et al. | |
| 6,151,457 A | 11/2000 | Kawamoto | |
| 6,175,430 B1 | 1/2001 | Ito | |
| 6,252,611 B1 | 6/2001 | Kondo | |
| 6,256,038 B1 * | 7/2001 | Krishnamurthy | 345/419 |
| 6,281,931 B1 | 8/2001 | Tsao et al. | |
| 6,289,103 B1 | 9/2001 | Sako et al. | |
| 6,314,493 B1 | 11/2001 | Luick | |
| 6,319,682 B1 | 11/2001 | Hochman | |
| 6,323,934 B1 | 11/2001 | Enomoto | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,469,707 B1 * | 10/2002 | Voorhies | 345/589 |
| 6,486,971 B1 | 11/2002 | Kawamoto | |
| 6,504,952 B1 | 1/2003 | Takemura et al. | |
| 6,584,202 B1 | 6/2003 | Montag et al. | |
| 6,594,388 B1 | 7/2003 | Gindele et al. | |
| 6,683,643 B1 | 1/2004 | Takayama et al. | |
| 6,707,452 B1 | 3/2004 | Veach | |
| 6,724,423 B1 | 4/2004 | Sudo | |
| 6,724,932 B1 | 4/2004 | Ito | |
| 6,737,625 B2 | 5/2004 | Baharav et al. | |
| 6,760,080 B1 | 7/2004 | Moddel et al. | |
| 6,785,814 B1 | 8/2004 | Usami et al. | |
| 6,806,452 B2 | 10/2004 | Bos et al. | |
| 6,839,062 B2 | 1/2005 | Aronson et al. | |
| 6,856,441 B2 | 2/2005 | Zhang et al. | |
| 6,891,543 B2 | 5/2005 | Wyatt | |
| 6,900,836 B2 | 5/2005 | Hamilton, Jr. | |
| 6,950,099 B2 | 9/2005 | Stollnitz et al. | |
| 7,009,639 B1 | 3/2006 | Une et al. | |
| 7,015,909 B1 | 3/2006 | Morgan, III et al. | |
| 7,023,479 B2 * | 4/2006 | Hiramatsu et al. | 348/243 |
| 7,088,388 B2 | 8/2006 | MacLean et al. | |
| 7,092,018 B1 | 8/2006 | Watanabe | |
| 7,106,368 B2 * | 9/2006 | Daiku et al. | 348/226.1 |
| 7,133,041 B2 * | 11/2006 | Kaufman et al. | 345/419 |
| 7,133,072 B2 | 11/2006 | Harada | |
| 7,146,041 B2 | 12/2006 | Takahashi | |
| 7,221,779 B2 * | 5/2007 | Kawakami et al. | 382/107 |
| 7,227,586 B2 | 6/2007 | Finlayson et al. | |
| 7,245,319 B1 | 7/2007 | Enomoto | |
| 7,305,148 B2 | 12/2007 | Spampinato et al. | |
| 7,343,040 B2 | 3/2008 | Chanas et al. | |
| 7,486,844 B2 | 2/2009 | Chang et al. | |
| 7,502,505 B2 | 3/2009 | Malvar et al. | |
| 7,580,070 B2 | 8/2009 | Yanof et al. | |
| 7,626,612 B2 | 12/2009 | John et al. | |
| 7,627,193 B2 | 12/2009 | Alon et al. | |
| 7,671,910 B2 | 3/2010 | Lee | |
| 7,728,880 B2 | 6/2010 | Hung et al. | |
| 7,750,956 B2 | 7/2010 | Wloka | |
| 7,817,187 B2 * | 10/2010 | Silsby et al. | 348/208.99 |
| 7,859,568 B2 | 12/2010 | Shimano et al. | |
| 7,860,382 B2 | 12/2010 | Grip | |
| 7,912,279 B2 | 3/2011 | Hsu et al. | |
| 8,049,789 B2 | 11/2011 | Innocent | |
| 8,238,695 B1 | 8/2012 | Davey et al. | |
| 8,456,547 B2 | 6/2013 | Wloka | |
| 8,456,548 B2 * | 6/2013 | Wloka | 348/246 |
| 8,456,549 B2 | 6/2013 | Wloka | |
| 8,471,852 B1 | 6/2013 | Bunnell | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 | 4/2002 | Suzuki | |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 | 11/2002 | Nguyen | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 * | 4/2003 | Fletcher et al. | 345/420 |
| 2003/0122825 A1 | 7/2003 | Kawamoto | |
| 2003/0142222 A1 | 7/2003 | Hordley | |
| 2003/0146975 A1 | 8/2003 | Joung et al. | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0218672 A1 | 11/2003 | Zhang et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0066970 A1 | 4/2004 | Matsugu | |
| 2004/0100588 A1 | 5/2004 | Hartson et al. | |
| 2004/0101313 A1 | 5/2004 | Akiyama | |
| 2004/0109069 A1 | 6/2004 | Kaplinsky et al. | |
| 2004/0189875 A1 * | 9/2004 | Zhai et al. | 348/669 |
| 2004/0218071 A1 | 11/2004 | Chauville et al. | |
| 2004/0247196 A1 | 12/2004 | Chanas et al. | |
| 2005/0007378 A1 | 1/2005 | Grove | |
| 2005/0007477 A1 | 1/2005 | Ahiska | |
| 2005/0030395 A1 | 2/2005 | Hattori | |
| 2005/0046704 A1 | 3/2005 | Kinoshita | |
| 2005/0099418 A1 | 5/2005 | Cabral et al. | |
| 2005/0111110 A1 | 5/2005 | Matama | |
| 2005/0175257 A1 | 8/2005 | Kuroki | |
| 2005/0185058 A1 | 8/2005 | Sablak | |
| 2005/0238225 A1 | 10/2005 | Jo et al. | |
| 2005/0243181 A1 | 11/2005 | Castello et al. | |
| 2005/0248671 A1 | 11/2005 | Schweng | |
| 2005/0261849 A1 | 11/2005 | Kochi et al. | |
| 2005/0286097 A1 | 12/2005 | Hung et al. | |
| 2006/0050158 A1 | 3/2006 | Irie | |
| 2006/0061658 A1 * | 3/2006 | Faulkner et al. | 348/207.1 |
| 2006/0087509 A1 * | 4/2006 | Ebert et al. | 345/473 |
| 2006/0119710 A1 * | 6/2006 | Ben-Ezra et al. | 348/208.99 |
| 2006/0133697 A1 | 6/2006 | Uvarov et al. | |
| 2006/0176375 A1 | 8/2006 | Hwang et al. | |
| 2006/0197664 A1 * | 9/2006 | Zhang et al. | 340/555 |
| 2006/0274171 A1 | 12/2006 | Wang | |
| 2006/0290794 A1 | 12/2006 | Bergman et al. | |
| 2006/0293089 A1 | 12/2006 | Herberger et al. | |
| 2007/0091188 A1 | 4/2007 | Chen et al. | |
| 2007/0147706 A1 * | 6/2007 | Sasaki et al. | 382/295 |
| 2007/0171288 A1 | 7/2007 | Inoue et al. | |
| 2007/0236770 A1 * | 10/2007 | Doherty et al. | 359/238 |
| 2007/0247532 A1 | 10/2007 | Sasaki | |
| 2007/0285530 A1 | 12/2007 | Kim et al. | |
| 2008/0030587 A1 * | 2/2008 | Helbing | 348/208.4 |
| 2008/0043024 A1 | 2/2008 | Schiwietz et al. | |

(56) References Cited

U.S. PATENT DOCUMENTS

| | | | |
|---|---|---|---|
| 2008/0062164 A1 | 3/2008 | Bassi et al. | |
| 2008/0101690 A1 | 5/2008 | Hsu et al. | |
| 2008/0143844 A1 | 6/2008 | Innocent | |
| 2008/0231726 A1 | 9/2008 | John | |
| 2009/0002517 A1 | 1/2009 | Yokomitsu et al. | |
| 2009/0010539 A1 | 1/2009 | Guarnera et al. | |
| 2009/0037774 A1 | 2/2009 | Rideout et al. | |
| 2009/0116750 A1 | 5/2009 | Lee et al. | |
| 2009/0128575 A1 | 5/2009 | Liao et al. | |
| 2009/0160957 A1* | 6/2009 | Deng et al. | 348/208.99 |
| 2009/0257677 A1 | 10/2009 | Cabral et al. | |
| 2010/0266201 A1 | 10/2010 | Cabral et al. | |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08-079622 | 3/1996 |
| JP | 2000516752 | 12/2000 |
| JP | 2001052194 | 2/2001 |
| JP | 2002-207242 | 7/2002 |
| JP | 2003-085542 | 3/2003 |
| JP | 2004-221838 | 8/2004 |
| JP | 2005094048 | 4/2005 |
| JP | 2005-182785 | 7/2005 |
| JP | 2005520442 | 7/2005 |
| JP | 2006025005 | 1/2006 |
| JP | 2006086822 | 3/2006 |
| JP | 2006-094494 | 4/2006 |
| JP | 2006121612 | 5/2006 |
| JP | 2006134157 | 5/2006 |
| JP | 2007019959 | 1/2007 |
| JP | 2007-148500 | 6/2007 |
| JP | 2007-233833 | 9/2007 |
| JP | 2007282158 | 10/2007 |
| JP | 2008085388 | 4/2008 |
| JP | 2008113416 | 5/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

Ko et al., "Fast Digital Image Stabilizer Based on Gray-Coded Bit-Plane Matching", IEEE Transactions on Consumer Electronics, vol. 45, No. 3, pp. 598-603, Aug. 1999.
Ko, et al., "Digital Image Stabilizing Algorithms Basd on Bit-Plane Matching", IEEE Transactions on Consumer Electronics, vol. 44, No. 3, pp. 617-622, Aug. 1988.
Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.
Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.
Parhami, Computer Arithmetic, Oxford University Press, Jun. 2000, pp. 413-418.
S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.
S. Erturk, "Real-Time Digital Image Stabilization Using Kalman Filters", http://www,ideallibrary.com, Real-Time Imaging 8, pp. 317-328, 2002.
Uomori et al., "Automatic Image Stabilizing System by Full-Digital Signal Processing", vol. 36, No. 3, pp. 510-519, Aug. 1990.
Uomori et al., "Electronic Image Stabiliztion System for Video Cameras and VCRS", J. Soc. Motion Pict. Telev. Eng., vol. 101, pp. 66-75, 1992.
Weerasinghe et al.; "Method of Color Interpolation in a Single Sensor Color Camera Using Green Channel Separation"; Visual Information Proessing lab, Motorola Australian Research Center; IV 3233-IV3236, 2002.
"A Pipelined Architecture for Real-Time Correction of Barrel Distortion in Wide-Angle Camera Images", Hau, T. Ngo, Student Member, IEEE and Vijayan K. Asari, Senior Member IEEE, IEEE Transaction on Circuits and Systems for Video Technology: vol. 15 No. Mar. 3, 2005 pp. 436-444.
"Calibration and removal of lateral chromatic aberration in images" Mallon, et al. Science Direct Copyright 2006; 11 pages.
"Method of Color Interpolation in a Single Sensor Color Camera Using Green Channel Seperation" Weerasighe, et al Visual Information Processing Lab, Motorola Australian Research Center pp. IV-3233-IV3236, 2002.
D. Doo, M. Sabin "Behaviour of recrusive division surfaces near extraordinary points"; Sep. 1978; Computer Aided Design; vol. 10, pp. 356-360.
D. W. H. Doo; "A subdivision algorithm for smoothing down irregular shaped polyhedrons"; 1978; Interactive Techniques in Computer Aided Design; pp. 157-165.
Davis, J., Marschner, S., Garr, M., Levoy, M., Filling holes in complex surfaces using volumetric diffusion, Dec. 2001, Stanford University, pp. 1-9.
E. Catmull, J. Clark, "recursively generated B-Spline surfaces on arbitrary topological meshes"; Nov. 1978; Computer aided design; vol. 10; pp. 350-355.
J. Stam; "Exact Evaluation of Catmull-clark subdivision surfaces at arbitrary parameter values"; Jul. 1998; Computer Graphics; vol. 32; pp. 395-404.
Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.
Kumar, S., Manocha, D., Interactive display of large scale trimmed NURBS models, 1994, University of North Carolina at chapel Hill, Technical Report, pp. 1-36.
Kuno et al. "New Interpolation Method Using Discriminated Color Correlation for Digital Still Cameras" IEEE Transac. On Consumer Electronics, vol. 45, No. 1, Feb. 1999, pp. 259-267.
Loop, C., DeRose, T., Generalized B-Spline surfaces of arbitrary topology, Aug. 1990, Sigraph 90, pp. 347-356.
M. Halstead, M. Kass, T. DeRose; "efficient, fair interpolation using catmull-clark surfaces"; Sep. 1993; Computer Graphics and Interactive Techniques, Proc; pp. 35-44.
T. DeRose, M., Kass, T. Troung; "subdivision surfaces in character animation"; Jul. 1998; Computer Graphics and Interactive Techniques, Proc; pp. 85-94.
Takeuchi, S., Kanai, T., Suzuki, H., Shimada, K., Kimura, F., Subdivision surface fitting with QEM-based mesh simplification and reconstruction of approximated B-spline surfaces, 2000, Eighth Pacific Conference on computer graphics and applications, pp. 202-212.
Keith R. Slavin; Application as Filed entitled "Efficient Method for Reducing Noise and Blur in a Composite Still Image From a Rolling Shutter Camera"; Application No. 12069669; Filed Feb. 11, 2008.
Goshtasby, Ardeshir, "Correction of Image Distortion From Lens Distortion Using Bezier Patches", 1989, Computer Vision, Graphics and Image Processing, vol. 47, pp. 358-394.

* cited by examiner

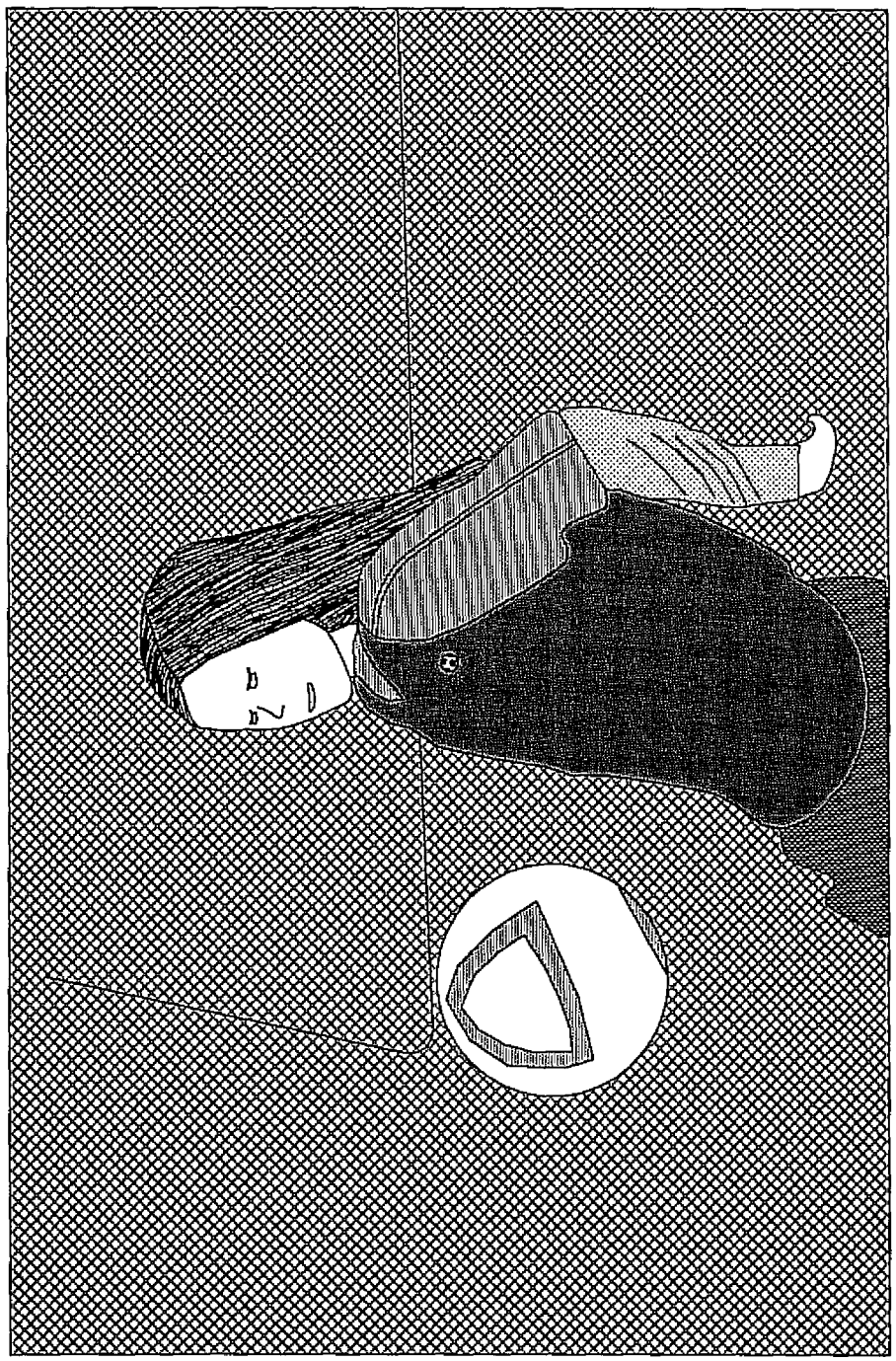
FIGURE 1 – Subject Scene

FIGURE 2 – image swaths

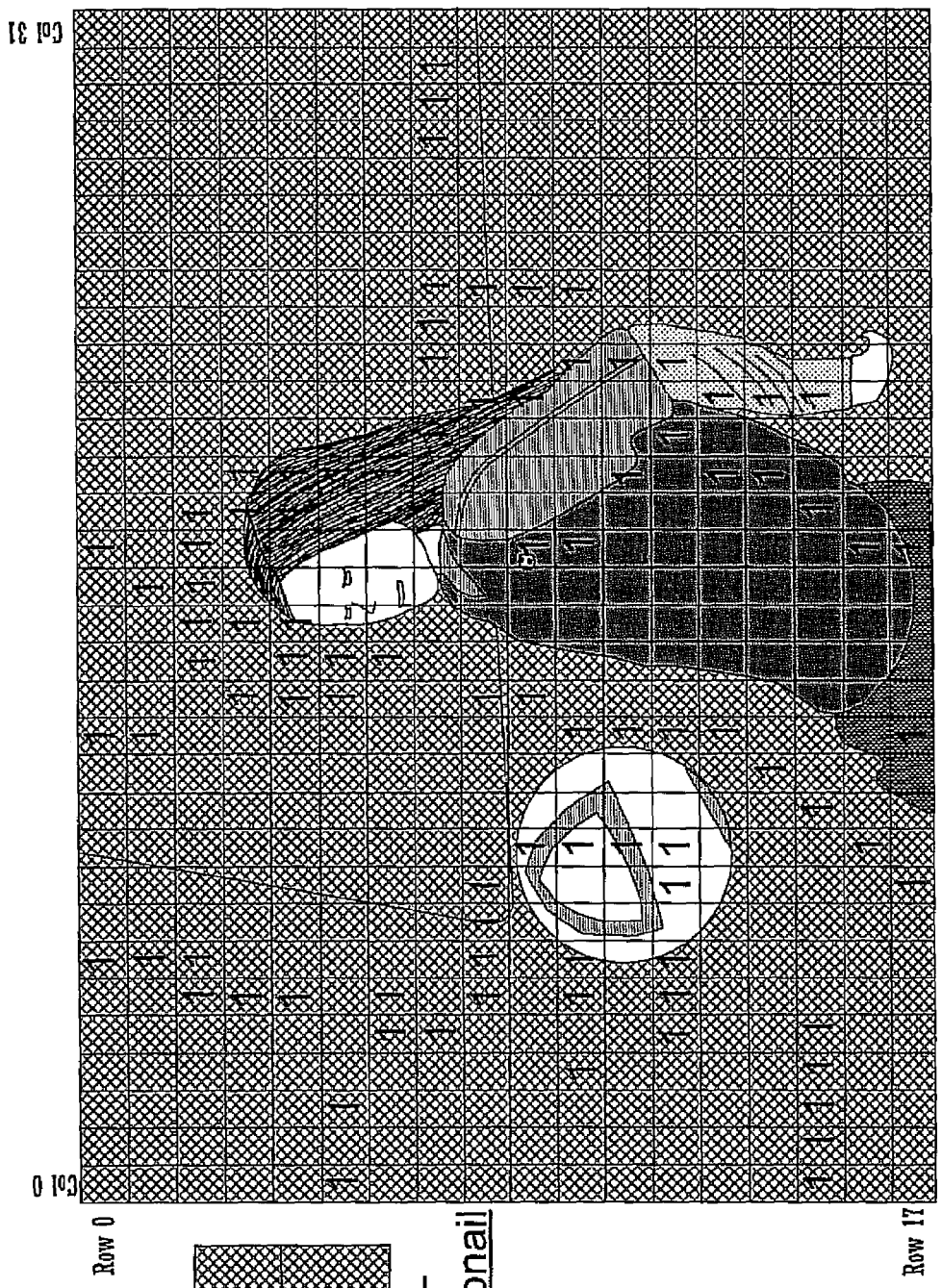
FIGURE 3 – LowRes Thumbnail
FIGURE 4 – Candidate Matrix

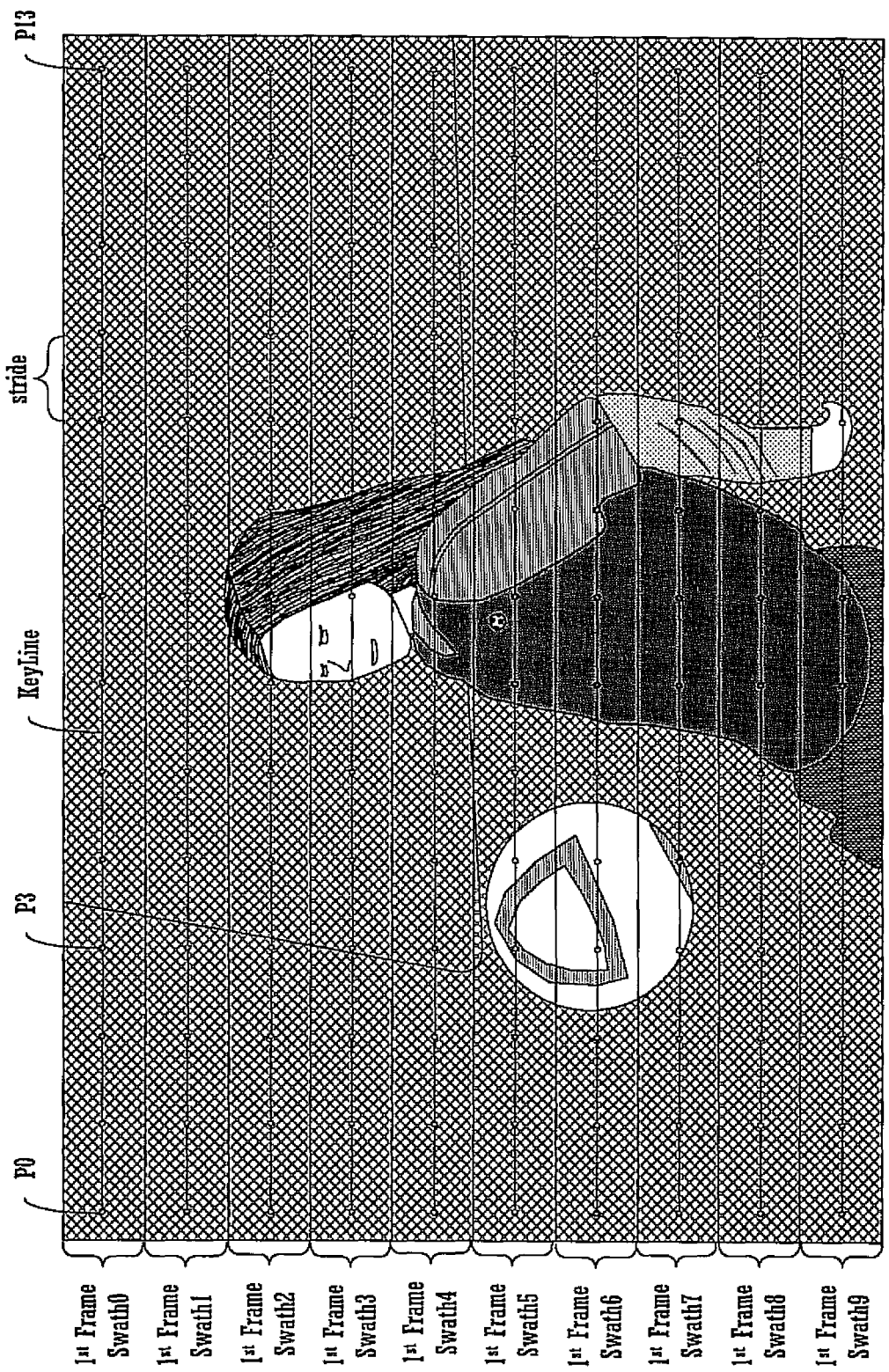
FIGURE 5 – Key Line Points

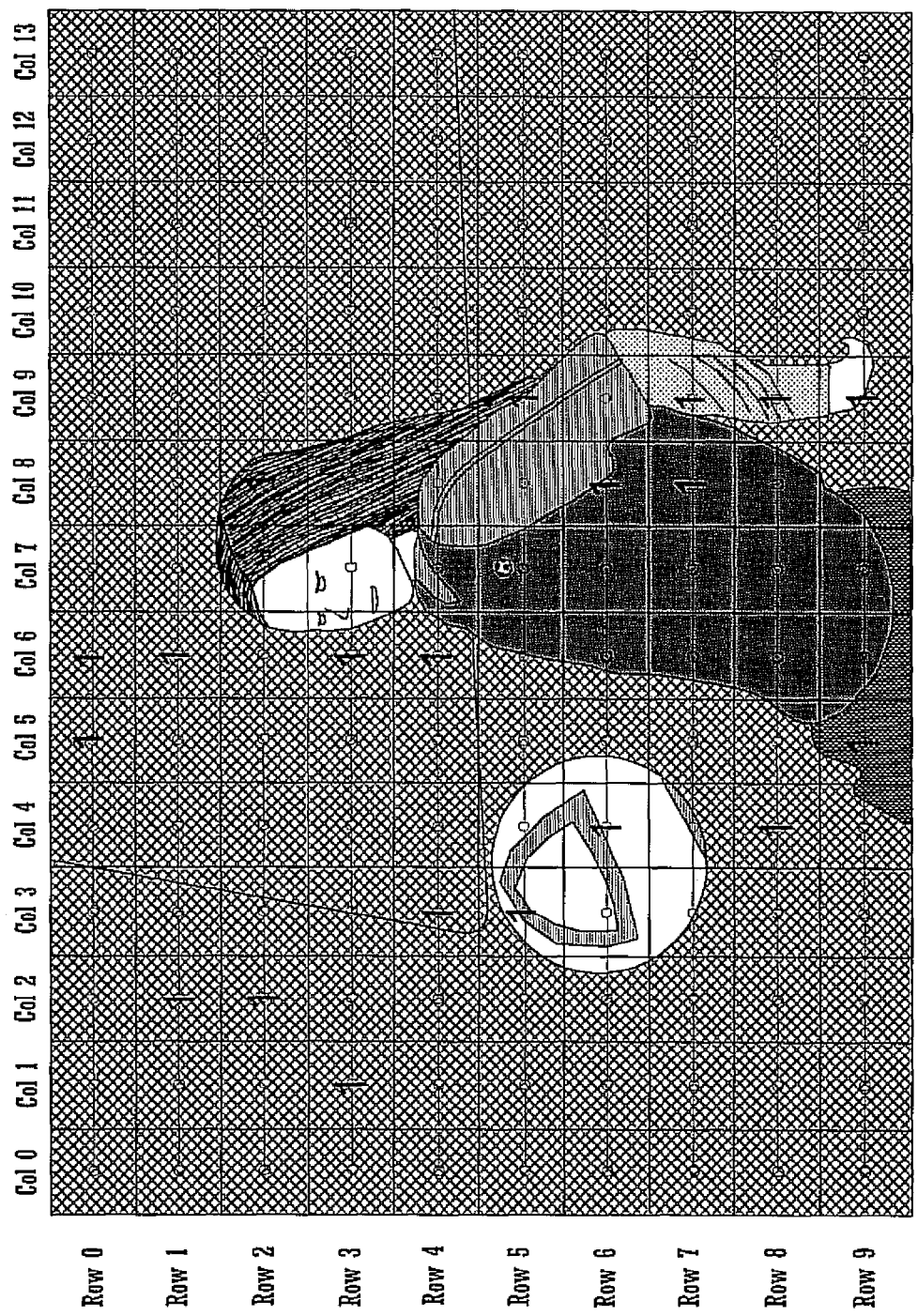
FIGURE 6 – Edge Matrix

FIGURE 7 – rolling shutter and camera motion

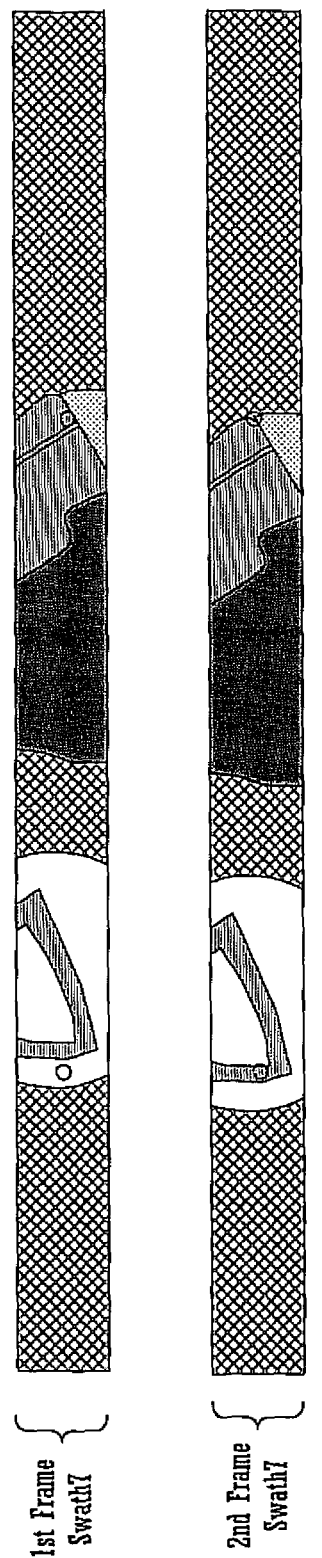
FIGURE 8 – rolling shutter effect

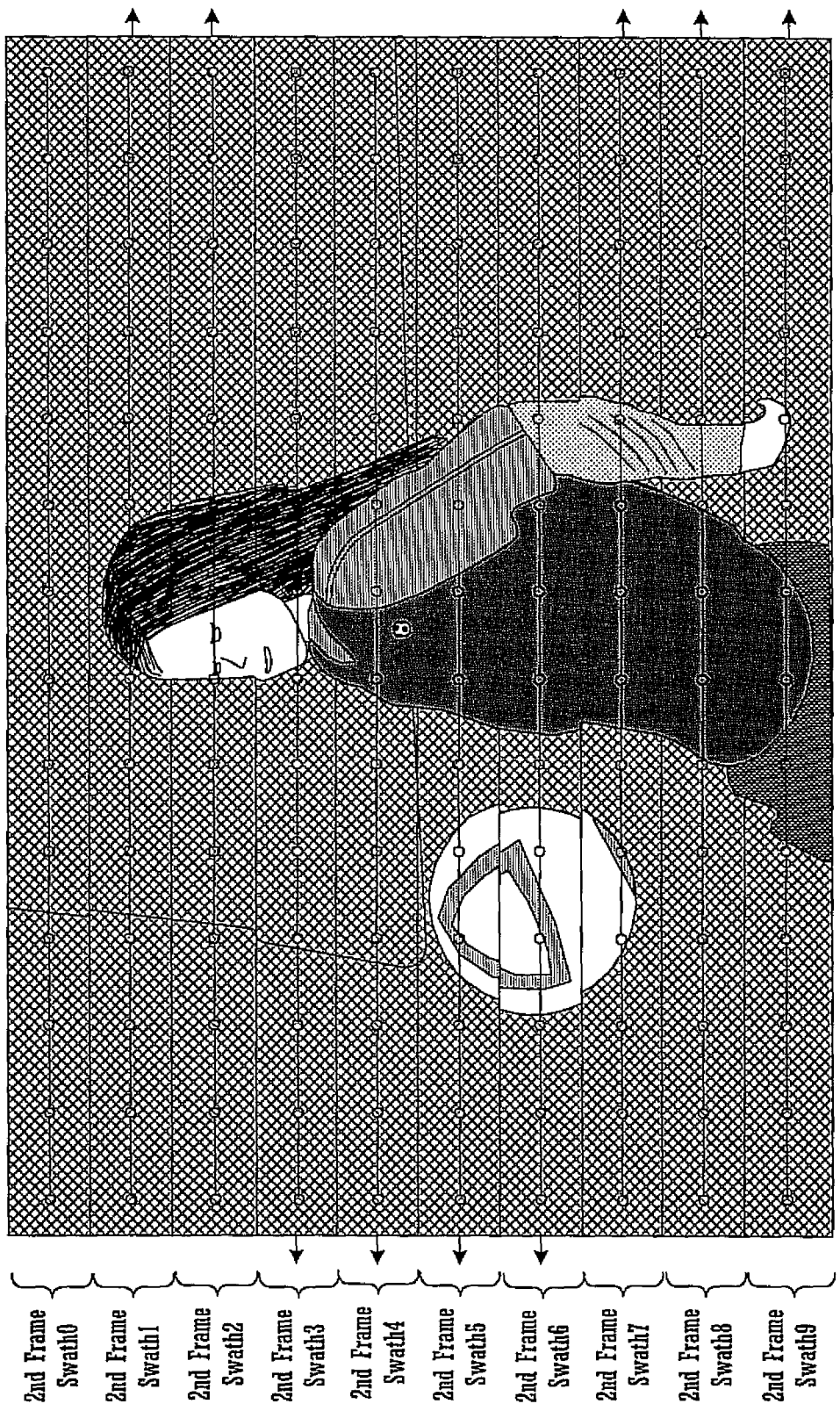
FIGURE 9 – points checking

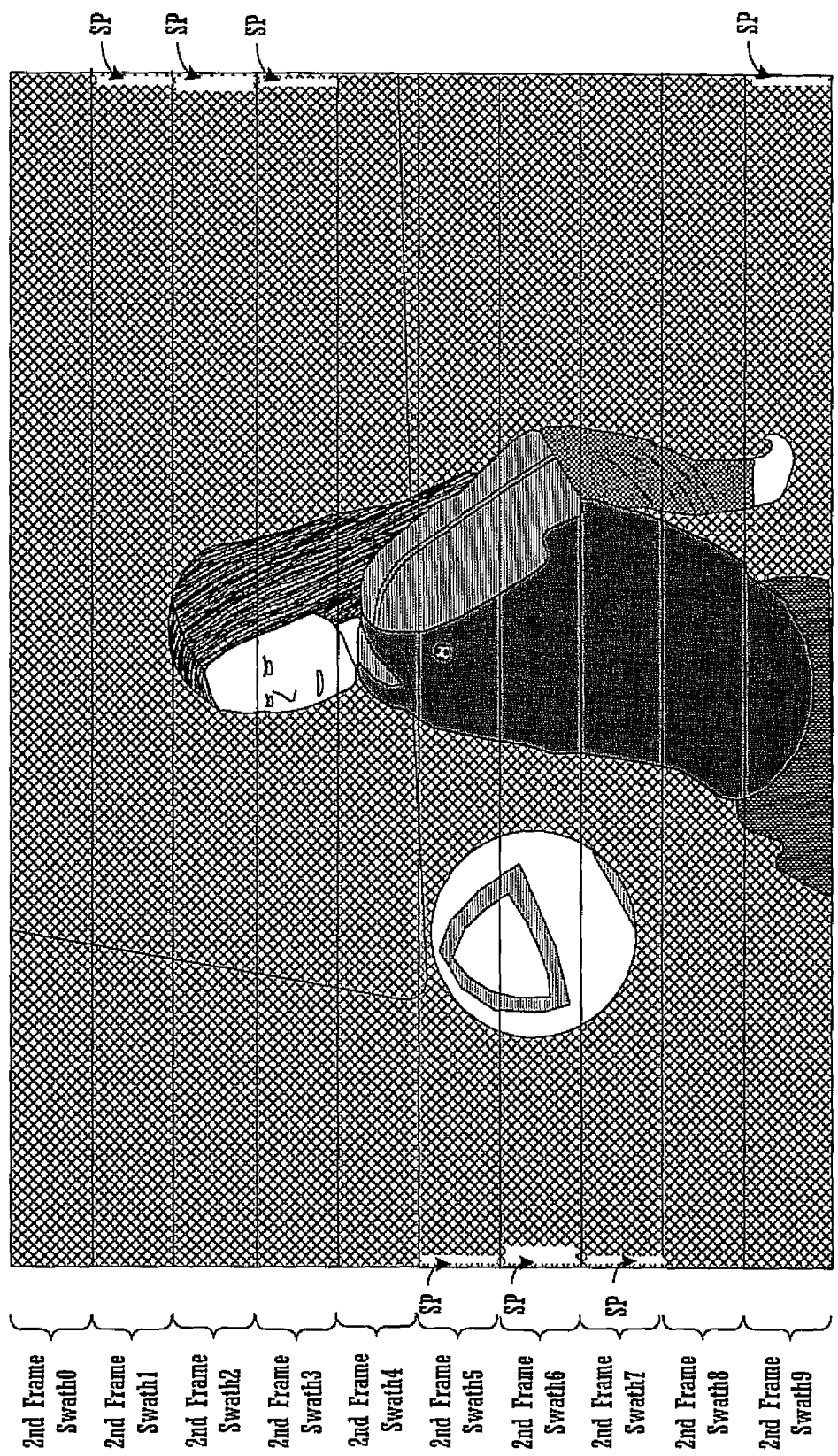
FIGURE 10 – motion compensation

EFFICIENT METHOD FOR REDUCING NOISE AND BLUR IN A COMPOSITE STILL IMAGE FROM A ROLLING SHUTTER CAMERA

BACKGROUND OF THE INVENTION

1. Technical Field of the Invention

This invention relates generally to deblurring of still images such as those captured by digital cameras, and more specifically to deblurring still images generated as a multi-frame full resolution image and especially those produced by a camera having a rolling shutter, meaning that the pixels of the frame are captured at different times.

2. Background Art

A digital camera includes a lens mechanism having a fixed or variable shutter and a fixed or variable aperture, and a sensor having a fixed or variable sensitivity. The terms ISO and SOS refer to different but related methods of measuring the effective, useable speed of a sensor. This disclosure will refer simply to these as "sensor speed" so as to not specifically distinguish between ISO and SOS characteristics. The term "shutter speed" will refer to the duration of the opening of the shutter.

Adjusting a digital camera's sensor speed upward enables the use of a faster shutter speed but tends to increase the noisiness of the resulting image, and adjusting it downward tends to decrease the noisiness but increases the required exposure duration.

Slow shutter speeds tend to result in blurred images, caused by motion of the camera and/or the photographed subject. This motion causes a time-dependent smearing in which the photons captured from a specific subject location fall upon different sensor locations. This will be referred to as "motion blur".

Some cameras have been adapted to reduce noise and motion blur by using what may be termed "multi-frame compositing". Rather than capturing a photograph by taking a single frame at e.g. 1/30 second shutter duration, which is likely to produce significant motion blur, an extremely rapid burst of e.g. three frames is taken at 1/90 second each, and the three frames are overlayed to produce the final image.

In the simplistic case, the frames are simply directly overlayed and the corresponding pixel values are added or perhaps averaged, depending upon the camera. While this helps reduce noise in a sqrt(n) manner for n averaged frames, it does not reduce motion blur.

To reduce motion blur, some cameras apply motion compensation to the burst frames, attempting to move each to the same registration versus the sensor. Typically, this is done using edge detection techniques which identify object edges and other localized regions in the image which exhibit high "activity levels", meaning lots of difference from surrounding pixels. Most edge detection is done primarily or exclusively with the luminance (Y') values of the pixels in a YUV or Y'CbCr color space, ignoring the chrominance values. Brightness differences are generally a much better indicator of an edge than are color differences. In these cameras, the motion vector estimation is performed on the entire image (or, more exactly, the entire $N^{th}$ frame versus the entire $1^{st}$ frame), or perhaps a portion of the image, to determine a single motion vector, and the entire $N^{th}$ frame is moved in the opposite vector and composited with the $1^{st}$ frame.

Most cameras, especially higher priced ones, use a "full frame" shutter which effectively exposes the entire sensor from the same opening time to the same closing time (except of course for the extremely small time differences caused by the motion of the aperture mechanism, which is so small as compared to the exposure duration as to be ignorable for these purposes).

More recently, some inexpensive cameras have been equipped with a "rolling shutter" mechanism which exposes different regions of the sensor at meaningfully different times. For example, a rolling shutter may expose each pixel for 1/90 second but take 1/5 second to expose the entire sensor. In other words, it takes 1/5 second to travel from the first line of the sensor to the last line of the sensor. Because each pixel is exposed for only 1/90 second, each pixel will not have significant motion blur. However, because there is 1/5 second between when the first row of pixels is exposed and when the last row of pixels is exposed, the subject and/or camera may have moved significantly.

What is needed is an improved camera apparatus and method for recompositing multi-frame images, which compensate for the motion-induced de-registration caused by a rolling shutter.

BRIEF DESCRIPTION OF THE DRAWINGS

FIG. 1 shows an exemplary scene to be photographed using a digital camera.

FIG. 2 shows the first frame of a multi-frame digital photograph of the scene of FIG. 1, and the logical division of the frame into horizontal swaths for dealing with the rolling shutter.

FIG. 3 shows the frame of FIG. 2 reduced to a thumbnail image.

FIG. 4 shows a candidate matrix identifying pixel locations in the thumbnail image that have a high activity level and are likely to be edges or the like.

FIG. 5 shows key lines and stride points used for selecting pixel regions that will be used in motion detection.

FIG. 6 shows a second frame of the multi-frame digital photograph, demonstrating (in a quantized manner) the effect of camera motion for a camera having a rolling shutter.

FIG. 7 shows corresponding swaths of the frames of FIGS. 2 and 6, demonstrating the de-registering effect of camera motion for a camera having a rolling shutter.

FIG. 8 shows-an analysis of the second frame of FIG. 6, using selected points along a key line of each frame.

FIG. 9 shows an edge matrix used to record a final selection of motion detection pixel regions.

FIG. 10 shows the second frame of FIG. 7 after the swaths have been re-registered to correct for camera motion.

DETAILED DESCRIPTION

Figure 11:
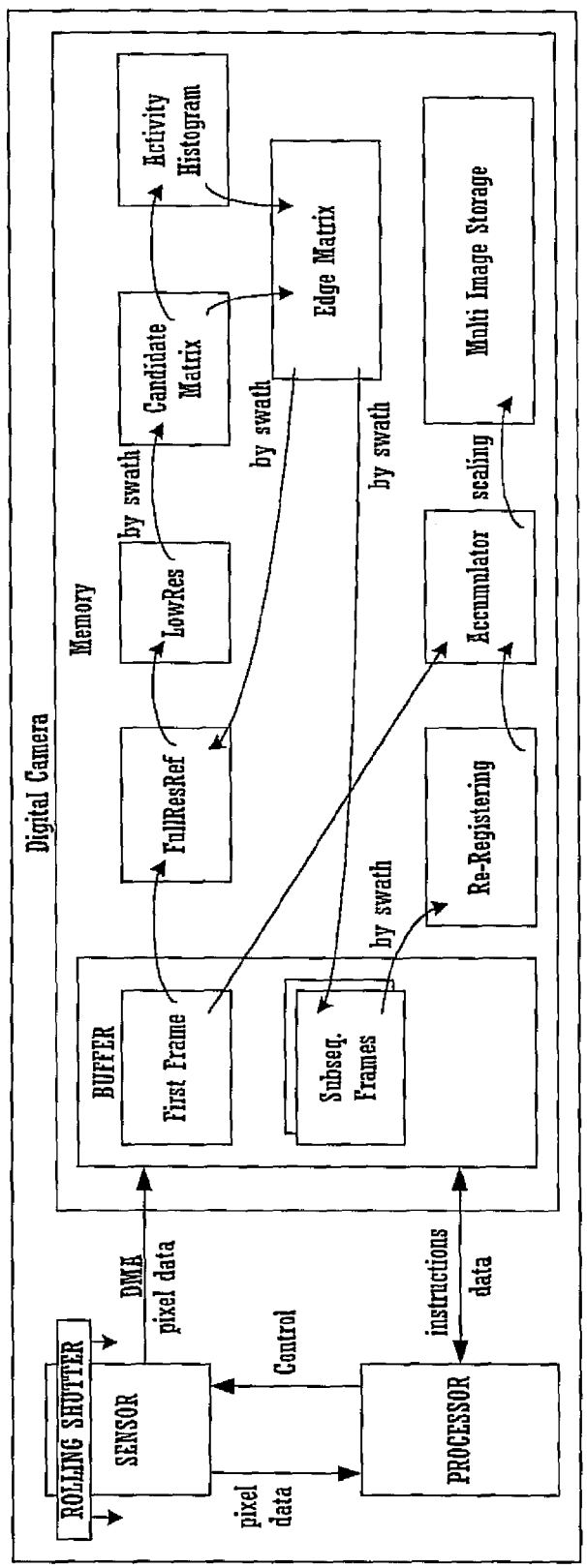
FIG. 11 shows a block diagram of a digital camera including means for performing the method of this invention.

The invention will be understood more fully from the detailed description given below and from the accompanying drawings of embodiments of the invention which, however, should not be taken to limit the invention to the specific embodiments described, but are for explanation and understanding only.

FIG. 11 illustrates a digital camera in which this invention may be practiced. For ease of illustration, various well-known components have been omitted from the drawing, such as lens elements, battery, user controls, body or frame, removable memory card and its slot, autofocus mechanism, and so forth.

The digital camera includes a sensor which may be a CCD charge coupled device, a CMOS circuit, or any other suitable means of digitally capturing photons (in or out of the visible spectrum) from a subject and from them generating an electronic representation of the subject. The sensor is equipped with a rolling shutter mechanism which, in this instance, scans the sensor from top to bottom. The camera includes a processor, which may be characterized as a digital signal processor, a microprocessor, a microcontroller, or the like. The processor may be constructed as a single, monolithic, integrated circuit, or as two or more separate ICs or other logic.

The processor is coupled to send control signals to the sensor and to receive pixel data from the sensor. The camera further includes a memory, which typically includes some amount of flash or other non-volatile memory, some of which may be removable, as well as a smaller amount of SRAM or DRAM configured as a high speed buffer for storing pixel data from the sensor as it is written to the slower non-volatile memory. Optionally, some or all of the buffer may be fabricated on the same IC as the processor, like an on-die cache memory. The details of the memory organization are not germane to this invention, so the memory is shown simply as a single entity. In some embodiments, the pixel data may travel from the sensor to the processor and then from the processor to the memory. In other embodiments, the sensor may be equipped with its own logic for performing direct memory access (DMA) to the memory, bypassing the processor.

The reader should continue to refer to FIG. 11 throughout the remainder of this disclosure, as the method of the invention will be explained with reference to various memory structures and to routines which reside in memory.

At a high level, the camera captures an image ("takes a picture") by capturing a rapid burst of images ("frames") from the sensor, and then amalgamating them into a final image which is written to a multi-image storage area in the memory.

It is highly desirable to reduce or eliminate errors in registration of the multiple frames.

The designer may make a variety of tradeoffs in configuring the operational routines that are performed by the camera, according to the parameters of the application at hand. For example, the buffer memory (or total memory other than the multi-image storage area) may be small, forcing the programmer to optimize his code for memory footprint. Or, the processor may have only a small amount of computational power or throughput, forcing the programmer to adjust parameters so that image quality may be sacrificed for faster execution speed.

In order to reduce computation and simplify motion detection, it is preferable to perform motion detection in the Y'CbCr or other luminance-with-color color space, using only the Y' luma component in calculating frame-to-frame motion. The alternative is to perform motion detection on each color, and then somehow decide which color represents the motion. The latter approach complicates processing for no real gain in final image quality. If the sensor produces e.g. an RGB image, the camera first converts the RGB image to Y'CbCr format for further processing.

FIG. 1 illustrates a scene to be photographed, including a girl and her soccer ball in the foreground and an out of focus background.

FIG. 2 illustrates the first frame of a multi-frame image captured by the camera, with its rolling shutter. The frame is logically divided into a plurality of horizontal swaths (in cases where the rolling shutter moves vertically), as a quantization compromise between treating the frame as though there were not a rolling shutter, and attempting to perform line-by-line motion correction. In the example shown, the frame is divided into ten equal swaths (Swath0 to Swath9).

For convenience, the height of each swath may be identical. If the vertical resolution of the sensor does not conveniently lend itself to an integer number of swaths, a last swath may be padded suitably. The more swaths there are, the fewer lines of pixels each will contain, and the more reliable the motion statistics may be in many cases, but the more computation will be required. In many embodiments, swath heights of around 50 pixels may be suitable. It is desirable, if the processing power and memory size permit, to make the swaths narrow enough that adjacent swaths are unlikely to have more than one pixel of relative displacement. The designer will be able to select a suitable number of swaths based on the abilities of the processor.

Because of the rolling shutter, the first frame itself might well have registration errors of its various swaths with respect to its first swath (which, being closest in time to when the user activated the shutter, is by definition correct). In some embodiments, the camera could use a frame other than the first frame as the reference frame. In other embodiments, including the one described below, the first frame is taken as the reference frame, and other frames are aligned to it in order to reduce noise.

The camera copies the first frame to an accumulator, which is a memory structure which advantageously has more bits per pixel than does a given frame, to permit the accumulation (addition) of multiple frames of the image. If each image will arrive as four frames and has a conventional 8 bits per subpixel (color component of a pixel), the designer could choose to configure the accumulator to have 10 bits per pixel ($4*2^8=2^{10}$) which minimizes the memory footprint of the accumulator, or he could simply use the next power of 2 size ($2^{16}$) which uses more memory but may yield faster computation. Optionally, the processor may subsample the chroma components of the image, to reduce the accumulator's memory footprint.

The camera also saves a full resolution reference (FullResRef) copy of the Y' luma component in another memory structure. The FullResRef serves as the reference against which subsequent images will be compared to detect motion. Thus, in one embodiment, motion detection is based solely on the Y' luma values and not on the chroma values. In other embodiments, motion detection could be performed using the full color space, in which case the FullResRef storage would need to be made larger to accommodate also storing the Cb and Cr values for each pixel, rather than just the Y' value.

In one embodiment, motion detection is limited to integer pixel displacements only. In other embodiments, finer-grained detection could be employed.

FIG. 3 illustrates a low resolution (LowRes) thumbnail version of the first full resolution frame, which is either received from the sensor or generated by the processor. The thumbnail is stored in another memory structure. In one embodiment, the LowRes image contains only Y' luma values, but in other embodiments it may also contain chroma values. In some embodiments, the LowRes image has the same aspect ratio as the full resolution image, but in others it may take any suitable form factor as determined according to the needs of the application at hand. For example, in one embodiment, the full resolution image is a 5 Mpixel image having a resolution of 2600 horizontal pixels by 1950 vertical pixels and a 4:3 aspect ratio, while the LowRes image has a resolution of 64 horizontal pixels by 64 vertical pixels and a 1:1 aspect ratio.

This inventor has observed that a thumbnail of the FullResRef typically contains enough information that it can be used to greatly reduce the amount of work required to identify enough "interesting" pixel regions against which subsequent images can effectively be compared for motion detection. Well-known image decimation techniques can be used to create a LowRes image having the desired aspect ratio (and X and Y values) from the FullResRef image with its potentially independent aspect ratio (and X and Y values).

FIG. 4 illustrates a Candidate Matrix (CM) which the processor stores into another memory structure. For convenience only, the CM has been overlayed on top of the thumbnail in the drawing, simply to assist the reader in visualizing what is being described. The CM is an array whose entries can be used to identify locations in the thumbnail which are likely to correspond to edges or other features whose motion is most easily trackable from frame to frame. In one embodiment, these locations are identified by inspecting every pixel in the thumbnail, and for each pixel, comparing it against its four "nearest neighbors" (those directly up, down, left, and right of the pixel), and summing the absolute values of the Y' differences between each neighbor and the pixel to determine an "activity level" of the pixel. In another embodiment, "next to nearest neighbors" or another such scheme could be used.

In one embodiment, pixels having an activity level above a predetermined threshold are marked as good candidates, and all others are marked as poor candidates. In another embodiment, the threshold is dynamically determined such that a predetermined percentage of the total pixels are marked as good candidates. In one such embodiment, this is done on a line by line basis. In the particular example shown, 1's mark pixels deemed good candidates, and the threshold has been dynamically adjusted on a line by line basis such that each line has between 3 and 8 of its 32 pixels marked as good candidates. The designer can select the threshold or range according to the parameters of the camera, such as the full resolution, size and speed of memory, computational throughput and latency of the processor, lens aperture, shutter speed, number of frames in a multi-frame image, and so forth.

In one embodiment, once the CM has been constructed and its values populated, the thumbnail is no longer needed and its memory can be released, and the CM is retained for the duration of the processing of the current multi-frame image. In another embodiment, the thumbnail is retained and the CM is recreated as needed, so the CM's storage may be periodically released. The designer can make many such tradeoffs, depending upon the dictates of the application at hand.

Once the CM has been completed, the processor can use it to perform a baseline analysis of the first frame.

FIG. 5 illustrates one method by which the processor can analyze the first frame. A key line is selected from each swath, and is used to represent the swath. In other words, only pixels on the key line are analyzed, to significantly reduce the amount of computation required. To still further reduce the required computation, only selected points along the key line are analyzed. In one embodiment, the key line is the horizontal line of pixels which is vertically half way between the top and bottom of the swath. In the example shown, there are fourteen points (P0 through P13) along the key line, spaced at even stride intervals. These may be termed "stride points". The first and last stride points may advantageously be inset from the left and right ends of the line, such that there are pixels on all sides of the end points and they can be analyzed in the same way as the inner points on the key line. In other words, the stride value and an initial offset value are selected such that dividing the line length (horizontal resolution) by the stride value, with the initial offset, produces the desired number of stride points and the end stride points are at desired offsets from the ends of the line.

For each swath in succession, the points on its key line are analyzed in a two-pass process. The first pass initializes then creates a histogram, and the second pass uses the histogram to identify the top N % most edge-like pixels and record them in an Edge Matrix (EM), where N is a predetermined value for example.

In the first pass, a stride point is analyzed by first converting its X,Y location in the frame into a corresponding position in the thumbnail—or, more precisely, in the CM. If the CM value at that position indicates that the pixel is not a good candidate (unlikely to be an edge), that point is simply skipped. If the CM value indicates that the pixel is a good edge candidate, then a more robust, fine-grain analysis is done in the full resolution frame.

In one mode, the fine-grain analysis includes all immediate neighbors of the pixel at the point in question. The immediate neighbors constitute a 3-by-3 array of pixels centered at the point. If the fine-grain analysis indicates that the pixel is still a good edge candidate, a histogram entry is incremented. In one embodiment, the histogram entry is selected by using the value max(3-by-3 array)−min(3-by-3 array) as an index into the histogram.

After all stride points in the key line have been analyzed, the histogram represents the swath. The processor inspects the histogram and identifies an index (CMI) such that a predetermined target activity level percentage (TAL) of the stride points in that swath have an activity level above that indexed by the CMI. For example, it may be desirable to perform re-registration using only the 10% most edge-like stride points. The value of TAL can be selected by the designer according to the processing power etc. constraints of the camera.

Then, once the CMI has been identified according to the TAL, the second pass can be made, to find the TAL % most edge-like stride points in the swath. A fine-grain (3-by-3) analysis is again made for each stride point whose CM counterpart indicates it to be a good candidate, and if the activity level is greater than Histogram[CMI], that stride point's entry in the Edge Matrix is set to indicate that it is actually an edge point against which future frames will be compared for motion. Alternatively, if memory permits, the results of the first pass fine-grain analysis could be saved and then simply read during the second pass, rather than being recalculated.

FIG. 6 illustrates an Edge Matrix corresponding to FIG. 5, with a TAL set to pick two stride points from each swath's key line as the only points that will be inspected in subsequent frames. The stride points in each swath's key line whose fine-grain analysis activity level was determined to be in the top two have been marked as 1's, with other entries cleared (to 0s).

The second pass is complete, the histogram memory can be released, and the Edge Matrix will be used for comparing future frames' swaths against the FullResRef copy of the first image's Y' luma values.

FIG. 7 illustrates the scene as captured by the sensor through the rolling shutter at a second (or subsequent) frame of the multi-frame image. Due to the rolling shutter, the frame has been distorted by camera movement. Some of the swaths have been de-registered versus the first frame, and slightly different portions of the scene have been captured. Swath0 was correctly registered, by coincidence. Beginning with Swath1, the camera moved leftward, which shifts the swath to the right as shown by the small arrow. When Swath2 was captured, the camera had moved even farther left, so Swath2 is shifted even farther to the right than Swath1 was. Beginning with Swath3, the camera began moving rightward, which shifts the swath to the left as shown by the small arrow. Swath3 is shifted left as compared to Swath2, but is still father right than correct registration. Swath4 is correctly registered by coincidence, but the camera continued moving rightward and Swath5 is shifted left. Swath6 is even farther left, but then the camera began moving leftward again and Swath7 is out of registration but less far left than Swath6. Swath8 happened to be correctly registered, but then Swath9 was shifted to the right.

The amount of shift will depend on the amount of camera movement and the speed of the rolling shutter. The amounts shown in the drawings are for illustration only. And, for ease of illustration, the drawings illustrate a simplistic example in which the camera movement is only in the horizontal plane. In reality, the camera may also move vertically, and may even twist.

FIG. 8 illustrates the reason that motion detection and re-registration is important in amalgamating a multi-frame image. FIG. 8 shows Swath7 from the first frame and from the second frame, aligned vertically according to the sensor alignment, showing de-registration according to the scene. The camera shifted to the right, causing the second frame's Swath7 to be shifted left. If the two swaths were blindly added together in the accumulator, each pixel in the first image (already in the accumulator) would be significantly blurred by having its value ultimate averaged with a value captured from an entirely different portion of the scene. For example, consider the "pixel value error" location circled in each of the swaths. While in the first swath that sensor location captured the image value for a spot on the girl's relatively white shirt sleeve, in the second swath that same sensor location captured the image value for a spot in the much darker (and probably different chroma) background.

This is the significance of de-registration. Unless frames/swaths are correctly re-registered, averaging them with the original frame will blur the image in unpredictable degrees dependent upon the amount of camera motion and the scene itself.

FIG. 9 illustrates the method by which swaths of second and subsequent frames are re-registered before being added to the accumulator. The same key line and stride point system is used as for the first frame (but not for populating an edge matrix), such that the same sensor points are used for comparison.

For each swath, the corresponding row of the Edge Matrix is consulted. For any stride point of the FullResRef identified as being in the top TAL % (by being marked as a 1), the same location is selected in the new frame. Any suitable pattern matching/motion estimation methodology can be used, to find the pixels in the new frame's swath which most closely resemble (by having the best pattern match of their neighbors versus the FullResRef) the first frame's corresponding swath. The searching may advantageously start from the displacement vector found on the previous swath, if this is not the first swath. A search may also be centered around a zero displacement in case the previous swath's motion vector is unreliable. If this swath is the first swath, then a wider search around the zero displacement may be needed in order to establish frame-to-frame motion. Searching then progresses systematically outward from the point in either case, because likelihood decreases as the distance from the center increases. For each match found, a motion vector is calculated, which describes how that stride point's pixel region moved from the first frame to the current frame. After all the EM-identified pixels have been thus examined, their resulting motion vectors are compared, to generate a single motion vector ascribed to the whole swath. Any suitable algorithm may be used in doing so. For example, preferably the mode (most common) motion vector would be selected.

In one mode, the new frame's swath may individually be re-registered in the inverse of the swath's overall motion vector, and the result added to the corresponding swath of the accumulator.

In another mode, overall motion vectors are calculated for all of the swaths of the current frame, and then some intelligence is applied against them as a set, before doing any re-registration and accumulation. For example, it is extremely unlikely that consecutive swaths would be correctly found to have moved "left 2 pixels", "left 2 pixels", "left 2 pixels", "right 17 pixels", and "left 2 pixels". In that case, it may be determined that the "right 17 pixels" vector is simply an error, and that swath's overall motion vector may be changed to e.g. the average of those above and below it.

FIG. 10 illustrates the re-registration of the swaths after the overall motion vectors have been made sane. Swath0 had not moved, so it is already in correct registration. Swath1 had moved slightly to the right, so it is re-registered slightly to the left. Note that this is, in effect, a shift operation. As in many familiar mathematical operations, the "what to shift in" question is important. In the case of a photograph, it would nearly always be catastrophic to shift in any particular, predetermined value such as black or white. The blank regions labeled "SP" contain the "shift pixel" locations which may be thought of as "missing pixels" behind the shift. It should be noted that this issue impacts not only the Y' luma values, but also the corresponding locations' CbCr chroma values.

In one embodiment, the missing pixels are filled by accumulating the corresponding pixel values from the FullResRef first frame. Alternatively, the missing pixel filling can be done by scaling the corresponding pixel locations in the accumulator by the value $F/(F-1)$, where F is the number of frames received so far (and the reference first frame is at $F=1$), and where averaging starts with frame $F=2$ so no divide-by-zero occurs. The first method is preferable in order to avoid magnifying errors in the accumulator. When using only Y for motion calculations, chrominance reference frame data is not usually kept in order to save memory, so the alternative method must be used in this case.

After all of the frames have been thus processed, the accumulator represents a scaled version of the final image. The accumulator is normalized by dividing its pixel values by F, the total number of frames in the multi-frame image. Then the accumulator contents can be written to the camera's multi-image storage, after being converted back to RGB space if necessary. In some cameras, it may also be desirable to first perform other conventional operations such as automatic white balancing, sharpening, cropping, generating EXIF information, and so forth, before storing the result as the final image.

Motion blur has been reduced by shooting a multi-frame burst of short-exposure frames rather than a single long-exposure frame. Noise has been reduced by having been averaged out, as random noise is unlikely to affect the same pixel in the same manner multiple times, and sensor pixel specific noise will be spread around the final image by the re-registration process. And rolling shutter artifacts have been reduced by re-registering swaths of the second and later images.

In one embodiment, the second and subsequent frame are compared against a saved copy of the first frame, rather than against the accumulator, to avoid motion detection errors caused by accumulation (of errors).

Tables 1-4 list pseudo-code such as may be used in performing one embodiment of the method of this invention, which may differ in some respects from that described above.

TABLE 1

MAIN ROUTINE

```
// main routine for building composite image
main
{  setup
   change color space to Y'CbCr or YUV
   FirstImage
   for each subsequent image
   {  NthImage
   }
   weight Accumulator for N images
   optionally change color space back
   output Accumulator to final image storage
} // main
```

TABLE 2

HANDLE FIRST IMAGE

```
// handle first image
FirstImage
{  validate image
   receive FullRes image
   make or receive LowRes thumbnail
   copy FullRes image to Accumulator
   copy FullRes image to FullResRef reference copy
   course grain edge check of LowRes image
   adaptively get % of pixels needed for performance/speed tradeoff
   save CM candidate matrix identifying active pixels in LowRes image
   BuildEdgeMatrix
} // FirstImage
```

TABLE 3

BUILD EDGE MATRIX

```
// build EM edge matrix listing most edge-like pixels in each swath
// of first image
BuildEdgeMatrix
{  for each swath in FullResRef
   {  clear EM[swath] edge matrix
      // first pass makes activity histogram of differentness around
      // strided pixels along KeyLine of swath
      clear AH[ ] activity histogram
      map KeyLine line of FullResRef to line CML of CM candidate
      matrix for each pixel in CM[CML]
      {  if CM[CML,pixel] is edge candidate
         {  fine grain edge check in FullResRef
            if edge pixel in FullResRef
            {  find max value of pixel and neighbors
               find min value of pixel and neighbors
               increment AH[max-min]
            } // if edge pixel
         } // if edge candidate
      } // for pixel
      select CMI CM index encompassing TAL target activity level
      // second pass finds TAL% most edge-like pixels
      for each pixel in CM[CML]
      {  if CM[CML,pixel] is edge candidate
         find max value of pixel and neighbors
         find min value of pixel and neighbors
         if (max-min) >= TAL
         {  set EM[swath,pixel] // marks this pixel as in top TAL%
         } // if TAL
      } // for pixel
      // after second pass, EM[swath] lists pixels to compare against
      // in subsequent frames
   } // for swath
} // BuildEdgeMatrix
```

TABLE 4

HANDLE SUBSEQUENT FRAME

```
// handle second etc. frame
NthFrame
{  receive NextFrame
   for each swath in NthFrame
   {  map swath to SL line in EM
      for each pixel listed in EM[SL]
      {  find FullResRef pixel region most closely matching NextImage
            pixel region around EM[SL,pixel]
         save movement vector
      } // for pixel
      use histogram to find most common movement vector for swath
      save common movement vector to MV[swath]
   } // for swath
   fix aberationally unlikely movement vectors
   for each swath in NthFrame
   {  add swath to Accumulator with movement vector adjustment
      weight Accumulator areas in "black bars" outside movement
   } // for swath
} // NthFrame
```

CONCLUSION

When one component is said to be adjacent another component, it should not be interpreted to mean that there is absolutely nothing between the two components, only that they are in the order indicated.

The various features illustrated in the figures may be combined in many ways, and should not be interpreted as though limited to the specific embodiments in which they were explained and shown.

Those skilled in the art, having the benefit of this disclosure, will appreciate that many other variations from the foregoing description and drawings may be made within the scope of the present invention. Indeed, the invention is not limited to the details described above. Rather, it is the following claims including any amendments thereto that define the scope of the invention.

In the claims, numbering and lettering is for convenience and clarity, and should not be interpreted as requiring any particular order of steps in a method. Ordering, if any, should be implied only where it is implicit in the recitation. For example, "(1) obtain a chicken, and (2) cook the chicken" does require an ordering, but "(1) set the table, and (2) cook dinner" does not; in the latter case, the two steps may be performed in either order or even in parallel.

What is claimed is:

1. A method of compositing a plurality of frames of a multi-frame image captured from a sensor having a rolling shutter in a digital camera, the method comprising:
   storing a first frame of a plurality of frames of a multi-frame image;
   generating a reference copy of the first frame;
   analyzing the reference copy to determine a plurality of motion detection reference regions;
   for each subsequent frame of the plurality of fames after the first frame,
      comparing portions of the subsequent frames of the plurality of frames to the plurality of motion detection reference regions of the reference copy to identify frames having activity levels above a predetermined threshold; and
      accumulating frames having activity levels above a predetermined threshold into an output image,
   wherein the reference copy of the first frame comprises a lower resolution than the first frame.

2. The method according to claim 1, wherein the method further comprises quantizing each of the plurality of frames into a correspond plurality of swaths.

3. The method according to claim 1, wherein the reference copy comprises a luminance component of a Y'CbCr color space corresponding to the first frame.

4. The method according to claim 1, wherein the first frame is stored in an accumulator.

5. The method according to claim 1, wherein the reference copy is generated by a processor comprised in the digital camera.

6. A method of generating a final output image from a burst of at least three frames of a multi-frame image from a sensor of a digital camera having a rolling shutter, the method comprising:
 accumulating a first frame of the multi-frame image into an accumulating image;
 dividing the first frame into a plurality of swaths;
 generating a reference copy corresponding to the first frame;
 identifying pixel locations in the reference copy having activity levels above a predetermined threshold in the generated thumbnail;
 for each subsequent frame in the multi-frame image,
  (i) dividing the subsequent frame into a corresponding plurality of swaths,
  (ii) for each swath in the subsequent frame,
   (a) comparing the swath of the subsequent frame to the corresponding swath of the first frame to identify a motion vector for the swath of the subsequent frame, and
   (b) re-registering the swath of the subsequent frame according to the motion vector,
  (iii) accumulating the subsequent frame into the accumulated image;
 (D) outputting the accumulated image as the final output image,
 wherein the reference copy corresponding to the first frame comprises a lower resolution than the first frame.

7. The method of claim 6 further comprising:
 analyzing the selected pixel region along a key line of the plurality of swaths of the first frame.

8. The method of claim 7 further comprising:
 for each swath of the first frame, selecting a selected plurality of pixel regions as a predetermined number of stride points.

9. The method of claim 8 further comprising:
 analyzing the selected pixel regions by constructing a histogram of activity levels of each stride point along the key line.

10. The method of claim 7 further comprising:
 selecting the key line to be substantially midway between a top of the swath and a bottom of the swath.

11. The method of claim 7 further comprising:
 for each stride point along the key line of each swath of the plurality of swaths, inspecting the lower resolution reference frame of the first frame to identify a predetermined number of candidate points, and searching for motion at a stride point only if the stride point is identified as a candidate point.

* * * * *